United States Patent
Perez et al.

(10) Patent No.: US 10,968,751 B2
(45) Date of Patent: Apr. 6, 2021

(54) TURBINE BLADE COOLING HOLE ARRANGEMENT

(71) Applicant: United Technologies Corporation, Farmington, CT (US)

(72) Inventors: Rafael A. Perez, Arecibo, PR (US); Eleanor D. Kaufman, Rocky Hill, CT (US); Donald Kastel, Hamden, CT (US); Andres E. Diaz, Humacao, PR (US); Efrain E. Vega, Manati, PR (US); Juan Pablo Lopez, Palm Beach Gardens, FL (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 0 days.

(21) Appl. No.: 16/131,429

(22) Filed: Sep. 14, 2018

(65) Prior Publication Data
US 2020/0088041 A1 Mar. 19, 2020

(51) Int. Cl.
*F01D 5/18* (2006.01)
(52) U.S. Cl.
CPC ........ *F01D 5/186* (2013.01); *F05D 2220/323* (2013.01); *F05D 2220/3213* (2013.01); *F05D 2230/10* (2013.01); *F05D 2230/21* (2013.01); *F05D 2230/53* (2013.01); *F05D 2240/306* (2013.01); *F05D 2240/80* (2013.01); *F05D 2250/74* (2013.01); *F05D 2260/202* (2013.01)

(58) Field of Classification Search
None
See application file for complete search history.

(56) References Cited

U.S. PATENT DOCUMENTS

| | | | |
|---|---|---|---|
| 8,590,595 B2 * | 11/2013 | Cretegny | B22D 11/005 164/420 |
| 9,062,556 B2 | 6/2015 | Papple et al. | |
| 9,121,289 B2 * | 9/2015 | Plante | F01D 5/186 |
| 9,581,029 B2 | 2/2017 | Papple et al. | |

* cited by examiner

*Primary Examiner* — Juan G Flores
(74) *Attorney, Agent, or Firm* — Cantor Colburn LLP

(57) ABSTRACT

A turbine blade for a gas turbine engine. The turbine blade having a plurality of cooling holes defined therein, at least some of the plurality of cooling holes being located on a suction side of an airfoil of the turbine blade and in fluid communication with an internal cavity of the turbine blade; and wherein the at least some of the plurality of cooling holes are located in the airfoil according to the coordinates of Tables 1 and/or 2.

20 Claims, 3 Drawing Sheets

TURBINE BLADE COOLING HOLE ARRANGEMENT

BACKGROUND

Various embodiments of the present disclosure relate generally to a blade for a gas turbine engine and, in one embodiment, to a cooling hole distribution for blades of a turbine section of the gas turbine engine.

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Both the compressor and turbine sections include rotating blades alternating between stationary vanes. The vanes and rotating blades in the turbine section extend into the flow path of the high-energy exhaust gas flow. All structures within the exhaust gas flow path are exposed to extreme temperatures. A cooling air flow is therefore utilized over some structures to improve durability and performance.

Accordingly, it is desirable to provide cooling air to turbine blades of a gas turbine engine.

BRIEF DESCRIPTION

Disclosed herein is a turbine blade for a gas turbine engine. The turbine blade having a plurality of cooling holes defined therein, at least some of the plurality of cooling holes being located on a suction side of an airfoil of the turbine blade and in fluid communication with an internal cavity of the turbine blade; and wherein the at least some of the plurality of cooling holes are located in the airfoil according to the coordinates of Tables 1 and/or 2.

In addition to one or more of the features described above, or as an alternative to any of the foregoing embodiments, the turbine blade is a second stage turbine blade of a high pressure turbine of the gas turbine engine.

In addition to one or more of the features described above, or as an alternative to any of the foregoing embodiments, at least some of the plurality of holes have a hole diameter in a range of 0.010 inches to 0.020 inches.

In addition to one or more of the features described above, or as an alternative to any of the foregoing embodiments, the blade further includes a platform and a root, the airfoil extending from the platform, wherein the platform, the root; and the airfoil are cast as a single part.

In addition to one or more of the features described above, or as an alternative to any of the foregoing embodiments, at least some of the plurality of holes have a hole diameter in a range of 0.010 inches to 0.020 inches.

In addition to one or more of the features described above, or as an alternative to any of the foregoing embodiments, the blade further includes a platform and a root, the airfoil extending from the platform, wherein the platform, the root; and the airfoil are cast as a single part.

In addition to one or more of the features described above, or as an alternative to any of the foregoing embodiments, the blade further includes a platform and a root, the airfoil extending from the platform, wherein the platform, the root; and the airfoil are cast as a single part.

Also disclosed herein is a turbine blade assembly for a gas turbine engine. The turbine blade assembly including: a rotor disk; a plurality of turbine blades secured to the rotor disk, each turbine blade having a plurality of cooling holes defined therein, at least some of the plurality of cooling holes being located on a suction side of an airfoil of the turbine blade and in fluid communication with an internal cavity of the turbine blade; and wherein the at least some of the plurality of cooling holes are located in the airfoil according to the coordinates of Tables 1 and/or 2.

In addition to one or more of the features described above, or as an alternative to any of the foregoing embodiments, the turbine blade assembly is a second stage turbine blade assembly of a high pressure turbine of the gas turbine engine.

In addition to one or more of the features described above, or as an alternative to any of the foregoing embodiments, at least some of the plurality of holes have a hole diameter in a range of 0.010 inches to 0.020 inches.

In addition to one or more of the features described above, or as an alternative to any of the foregoing embodiments, wherein each of the plurality of turbine blades further include a platform and a root, the airfoil extending from the platform, wherein the platform, the root; and the airfoil are cast as a single part.

In addition to one or more of the features described above, or as an alternative to any of the foregoing embodiments, at least some of the plurality of holes have a hole diameter in a range of 0.010 inches to 0.020 inches.

In addition to one or more of the features described above, or as an alternative to any of the foregoing embodiments, wherein each of the plurality of turbine blades further includes a platform and a root, the airfoil extending from the platform, wherein the platform, the root; and the airfoil are cast as a single part.

In addition to one or more of the features described above, or as an alternative to any of the foregoing embodiments, wherein each of the plurality of turbine blades further includes a platform and a root, the airfoil extending from the platform, wherein the platform, the root; and the airfoil are cast as a single part.

Also disclosed herein is a method of cooling a suction side of an airfoil of a turbine blade of a gas turbine engine. The method including the steps of: forming a plurality of cooling holes in the turbine blade, at least some of the plurality of cooling holes being located on a suction side of the airfoil of the turbine blade and in fluid communication with an internal cavity of the turbine blade; wherein the at least some of the plurality of cooling holes are located in the airfoil according to the coordinates of Tables 1 and/or 2.

In addition to one or more of the features described above, or as an alternative to any of the foregoing embodiments, the turbine blade is a second stage turbine blade of a high pressure turbine of the gas turbine engine.

In addition to one or more of the features described above, or as an alternative to any of the foregoing embodiments, at least some of the plurality of holes have a hole diameter in a range of 0.010 inches to 0.020 inches.

In addition to one or more of the features described above, or as an alternative to any of the foregoing embodiments, the turbine blade further includes a platform and a root, the airfoil extending from the platform, wherein the platform, the root; and the airfoil are cast as a single part.

In addition to one or more of the features described above, or as an alternative to any of the foregoing embodiments, at least some of the plurality of holes have a hole diameter in a range of 0.010 inches to 0.020 inches.

In addition to one or more of the features described above, or as an alternative to any of the foregoing embodiments, wherein the turbine blade further includes a platform and a root, the airfoil extending from the platform, wherein the platform, the root; and the airfoil are cast as a single part.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
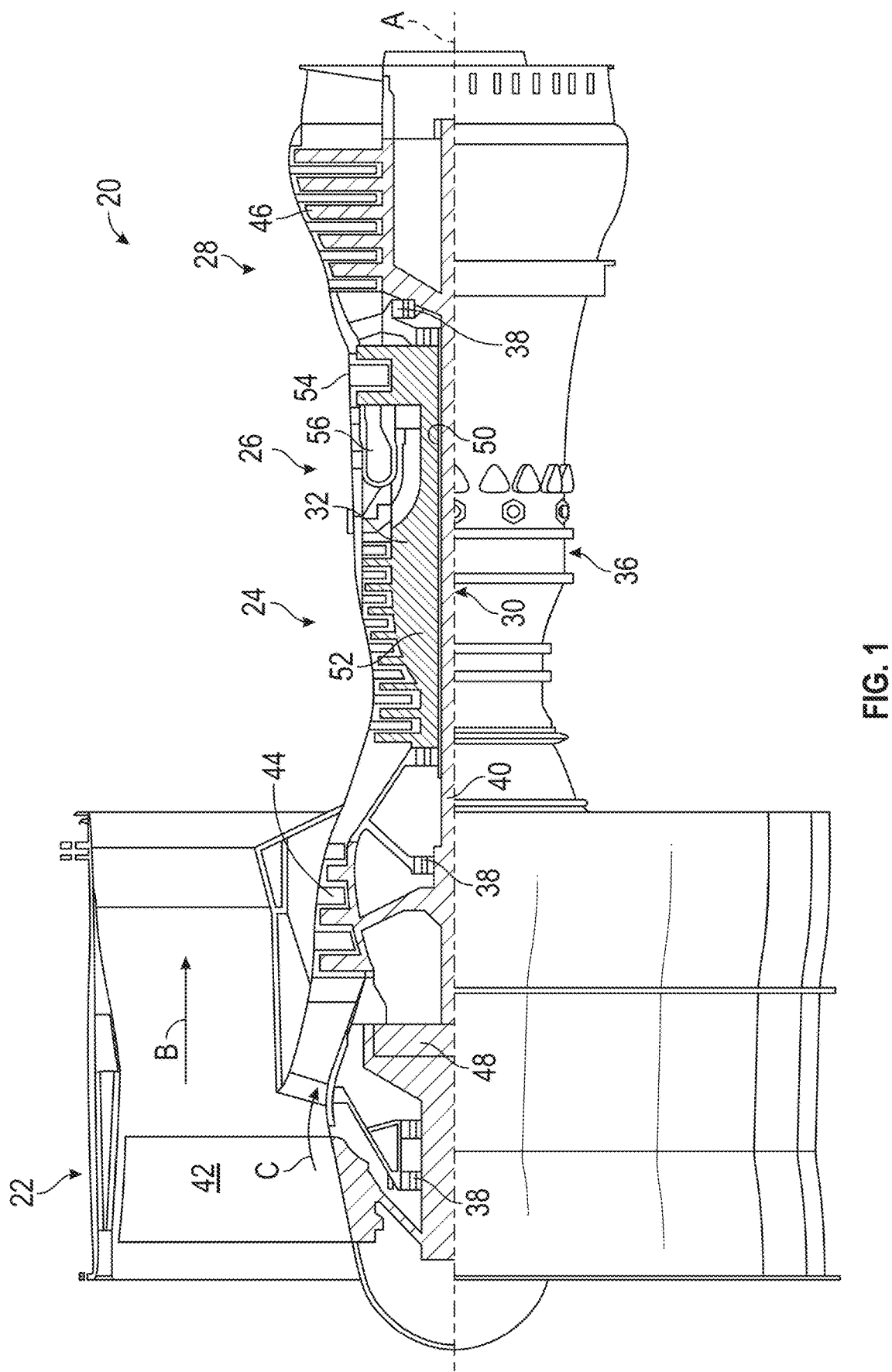
FIG. 1 is a schematic, partial cross-sectional view of a gas turbine engine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
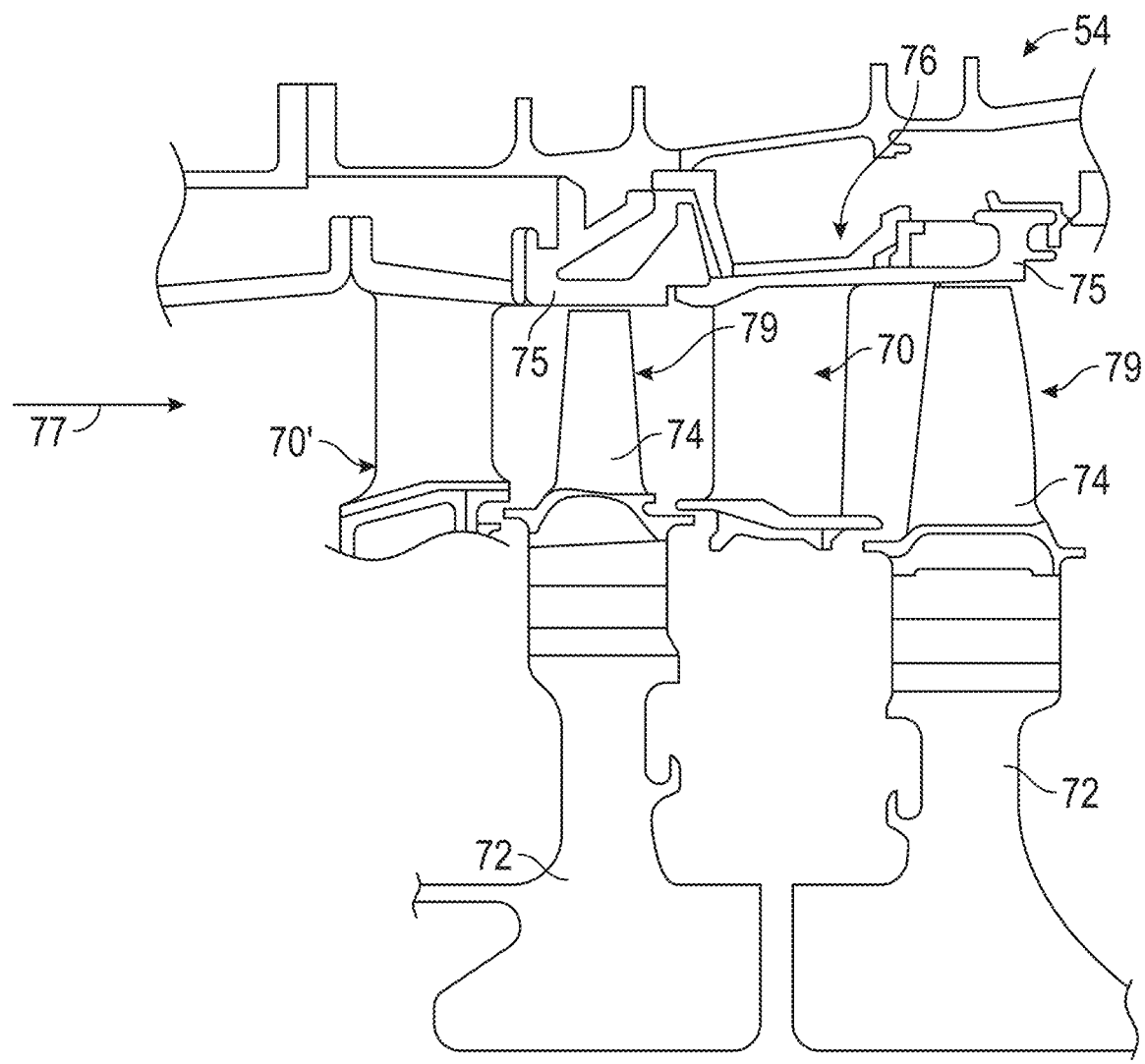
FIG. 2 is a schematic view of a two-stage high pressure turbine of the gas turbine engine.

FIG. 2 illustrates a portion of a high pressure turbine (HPT) 54. FIG. 2 also illustrates a high pressure turbine stage vanes 70 one of which (e.g., a first stage vane 70') is located forward of a first one of a pair of turbine disks 72 each having a plurality of turbine blades 74 secured thereto. The turbine blades 74 rotate proximate to a blade outer air seal (BOAS) 75 which is located aft of the vane 70 or first stage vane 70'. The other vane 70 is located between the pair of turbine disks 72. This vane 70 may be referred to as the second stage vane. As used herein the first stage vane 70' is the first vane of the high pressure turbine section 54 that is located aft of the combustor section 26 and the second stage vane 70 is located aft of the first stage vane 70' and is located between the pair of turbine disks 72. In addition, a blade outer air seal (BOAS) 75 is disposed between the first stage vane 70' and the second stage vane 70. The high pressure turbine stage vane 70 (e.g., second stage vane) or first stage vane 70' is one of a plurality of vanes 70 that are positioned circumferentially about the axis A of the engine in order to provide a stator assembly 76. Hot gases from the combustor section 56 flow through the turbine in the direction of arrow 77. Although a two-stage high pressure turbine is illustrated other high pressure turbines are considered to be within the scope of various embodiments of the present disclosure.

The high pressure turbine (HPT) is subjected to gas temperatures well above the yield capability of its material. In order to mitigate such high temperature detrimental effects, surface film-cooling is typically used to cool the vanes of the high pressure turbine. Surface film-cooling is achieved by supplying cooling air from the cold backside through cooling holes drilled on the high pressure turbine components. Cooling holes are strategically designed and placed on the vane and turbine components in-order to maximize the cooling effectiveness and minimize the efficiency penalty.

Referring now to at least FIGS. 1-3B, a turbine blade 74 is illustrated. As mentioned above, turbine blades 74 are secured to a turbine disk 72 that is configured to rotate about axis A. The turbine disk 72 and its turbine blades 74 may be referred to as a turbine blade assembly 79. The turbine blades 74 and their associated disks 72 are located behind or downstream from either the first stage vane 70' or the second stage vane 70.

Each turbine blade 74 has an airfoil 80 that extends radially from a platform 82. When the turbine blade 74 is secured to the turbine disk 72 and the disk 72 is secured to the engine 20, the airfoil 80 is further away from axis A than the platform 82. In other words, the airfoil 80 extends radially away from the platform 82 such that the airfoil 80 is at a further radial distance from the axis A than the platform 82.

The airfoil 80 has a leading edge 84 and a trailing edge 86. In addition, the airfoil 82 is provided with an internal cavity or cavities 85 that is/are in fluid communication with a source of cooling air or fluid. The airfoil 82 has a plurality of cooling openings 88 that are in fluid communication with the internal cavity 85 in order to provide a source of cooling fluid or air to portions of the airfoil 82 such that film cooling can be provided in desired locations.

Figure 3B:
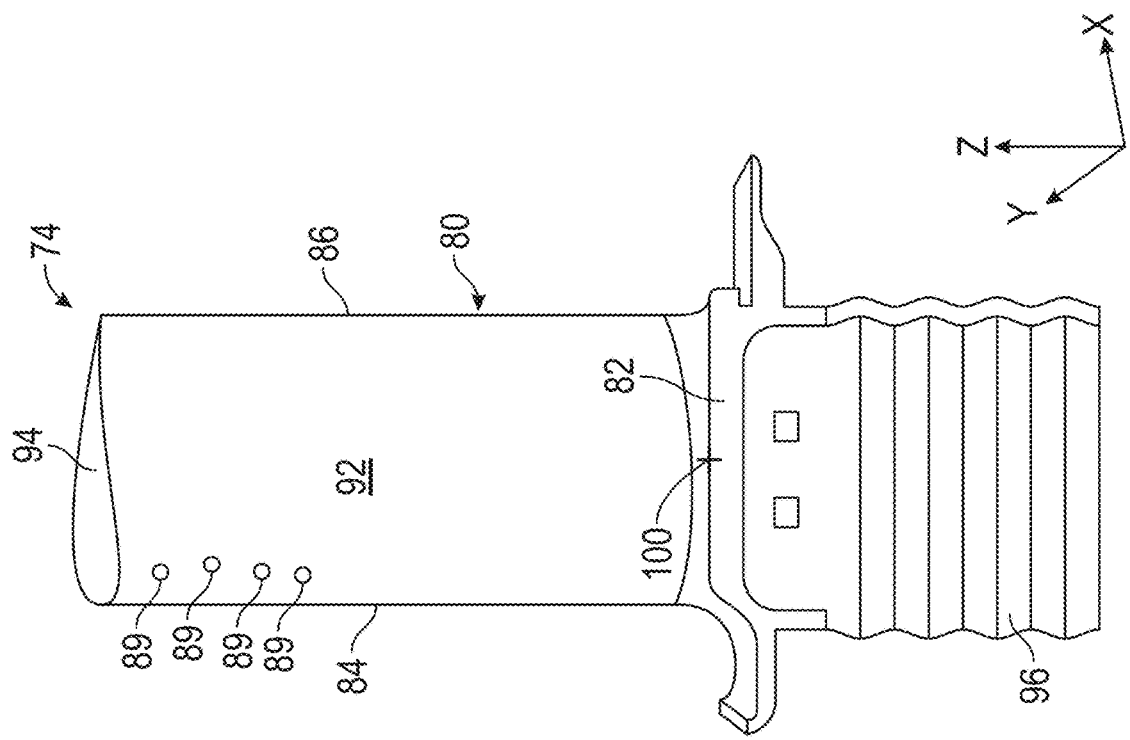
FIGS. 3A and 3B are side view of an airfoil of the two-stage high pressure turbine of the gas turbine engine according to an embodiment of the present disclosure.
Figure 3A:
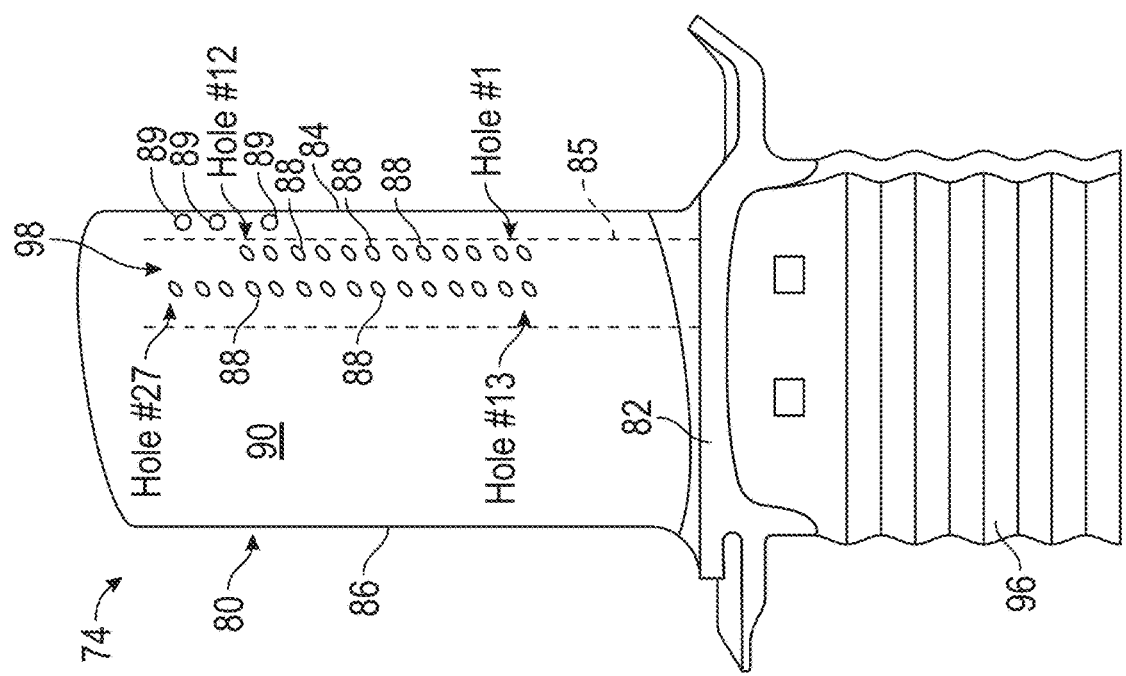

The airfoil 80 has a suction side 90 and a pressure side 92 each of which extends between the leading edge 84 and the trailing edge 86. The airfoil also terminates at a tip 94 that is furthest radially from the platform 82. FIG. 3A is a side view illustrating the suction side 90 of the airfoil 80 and its plurality of cooling openings 88. FIG. 3B is a side view illustrating the pressure side 92 of the airfoil 80.

Also shown in at least FIGS. 3A and 3B, is a root or root portion 96. Root or root portion 96 is used to secure the turbine blade 74 to the turbine disk 72. In one embodiment, the airfoil 80 may be integrally formed or cast with the platform 82 and/or the root portion 96. In other words, the turbine blade 74 including the airfoil 80, the platform 82 and the root 96 may be cast as a single part.

As mentioned above, turbine components are subjected to gas temperatures well above the yield capability of its material. In accordance with the present disclosure and in one embodiment the cooling holes 88 may be formed into an array 98 illustrated in at least FIG. 3A and as described in Table 1 below. In one embodiment, these cooling holes 88 of array 98 are located on the suction side 90 of the airfoil 80 and the turbine blade 74 is one of a plurality of blades that are located in the second stage rotor disk 72. In other words and in one embodiment, the turbine blade 74 with the aforementioned holes 88 is a second stage turbine blade 74 located behind a second stage vane 70 of the high pressure turbine 54 wherein the cooling holes 88 of Table 1 are located on a suction side 90 of the airfoil 80.

As such and in one embodiment, the second stage rotor disk 72 will comprise a plurality of turbine blades 74 each having a plurality of cooling holes 88 located on the suction side 90 of the airfoil 80 of the turbine blade 74. The cooling holes 88 may be circular or conical in shape and can be oriented axially or at a radial axis relative to the engine axis A. Of course, other numerous configurations are considered to be within the scope of various embodiments of the present disclosure. In one embodiment, these cooling holes 88 may also be used in combination with other cooling holes 89 located throughout the turbine blade 74. These other cooling holes may be located on anyone of the leading edge 84, trailing edge 86, tip 94, platform 82, suction side 90, and pressure side 92 of the turbine blade 74.

In one non-limiting embodiment, the dimensions of all of the aforementioned holes are in the range of 0.010 inches to 0.020 inches. Of course, ranges greater or less than the aforementioned ranges are considered to be within the scope of various embodiments of the present disclosure.

The locations of the holes 88 in airfoil 80 may further be defined by the dimensions of Tables 1 and/or 2, wherein the center of each hole 88 is provided by the following Cartesian coordinates. In Table 1, the X, Y and Z dimensions refer to the distance between centers of the holes in the X, Y and Y directions respectively and a point of origin O 100 on the turbine blade 84, which is defined by reference numeral 100 in FIG. 3B. In addition, the location of the holes 88 in Table 1 are located on an exterior surface of the airfoil and extend inwardly through the wall of the airfoil 80 so that they are in fluid communication with internal cavities 85 of the airfoil 80 so that cooling fluid may be applied to the exterior surface of the airfoil in order to provide film cooling to the airfoil 80. In one embodiment, the point of origin 100 is radially located on the platform surface and it is axially located on the center of the blade stacking line of the blade.

In Table 2, the X, Y and Z dimensions refer to the distance between centers of the holes in the X, Y and Y directions respectively and a point of origin O on the turbine blade 84, which is defined by reference numeral 100 in FIG. 3B. In addition, the location of the holes 88 in Table 2 are located on an interior surface of the wall of the airfoil 80 and extend outwardly through the wall of the airfoil 80. As used herein wall of the airfoil 80 is used to define a portion of the airfoil 80 that surround the internal cavities 85. As such, the interior surface of the wall may define a portion of the internal cavities 85 so that the cooling holes 88 are in fluid communication with internal cavities 85 of the airfoil 80 so that cooling fluid may be applied to the exterior surface of the airfoil from the interior surface of the wall of the airfoil 80 in order to provide film cooling to the airfoil 80. In one embodiment, the point of origin 100 is radially located on the platform surface and it is axially located on the center of the blade stacking line of the blade.

It is contemplated that the airfoil 80 may be formed with the cooling holes 88 with the dimensions of Table 1 alone or with the dimensions of Table 2 alone or with the dimensions of both Tables 1 and 2. When the airfoil is formed with the dimensions of Tables 1 and 2, the angular orientation of the cooling holes through the wall of the airfoil 80 is defined.

In one non-limiting embodiment, the center of the impingement holes or cooling holes has a true position tolerance of up to ±0.060 inches due to manufacturing and assembly tolerances. In yet another non-limiting embodiment, the center of the impingement holes or cooling holes has a true position tolerance of up to ±0.040 inches due to manufacturing and assembly tolerances. In still yet another embodiment, the center of the impingement holes or cooling holes has a true position tolerance of up to ±0.020 inches due to manufacturing and assembly tolerances.

TABLE 1

| Hole # | X | Y | Z | |
|---|---|---|---|---|
| 1 | −0.484 | 0.458 | 1.596 | Leading |
| 2 | −0.477 | 0.470 | 1.681 | Edge (LE) |
| 3 | −0.470 | 0.482 | 1.766 | Break-in |
| 4 | −0.464 | 0.494 | 1.851 | wherein hole |
| 5 | −0.457 | 0.505 | 1.936 | 1 is closest |
| 6 | −0.450 | 0.517 | 2.021 | to the inside |
| 7 | −0.444 | 0.528 | 2.106 | diameter |
| 8 | −0.438 | 0.538 | 2.191 | (ID) of the |
| 9 | −0.433 | 0.548 | 2.276 | airfoil and |
| 10 | −0.426 | 0.558 | 2.361 | hole 12 is |
| 11 | −0.419 | 0.568 | 2.446 | closest to the |
| 12 | −0.413 | 0.579 | 2.531 | outside diameter (OD) of the airfoil. |
| 13 | −0.249 | 0.542 | 1.638 | Trailing |
| 14 | −0.245 | 0.550 | 1.723 | Edge (TE) |
| 15 | −0.240 | 0.559 | 1.808 | Break-in |
| 16 | −0.234 | 0.567 | 1.893 | wherein hole |
| 17 | −0.229 | 0.575 | 1.978 | 13 is closest |
| 18 | −0.226 | 0.583 | 2.063 | to the inside |
| 19 | −0.221 | 0.590 | 2.148 | diameter |
| 20 | −0.218 | 0.597 | 2.233 | (ID) of the |
| 21 | −0.215 | 0.603 | 2.318 | airfoil and |
| 22 | −0.210 | 0.610 | 2.403 | hole 27 is |
| 23 | −0.206 | 0.616 | 2.488 | closest to the |
| 24 | −0.200 | 0.622 | 2.573 | outside |
| 25 | −0.194 | 0.629 | 2.658 | diameter |
| 26 | −0.186 | 0.635 | 2.743 | (OD) of the |
| 27 | −0.179 | 0.641 | 2.828 | airfoil. |

TABLE 2

| Hole # | X | Y | Z | |
|---|---|---|---|---|
| 1 | −0.493 | 0.388 | 1.527 | Leading Edge |
| 2 | −0.487 | 0.400 | 1.611 | (LE) Break-in |
| 3 | −0.480 | 0.412 | 1.696 | wherein hole |
| 4 | −0.474 | 0.423 | 1.781 | 1 is closest to |
| 5 | −0.468 | 0.435 | 1.866 | the inside |
| 6 | −0.462 | 0.447 | 1.951 | diameter (ID) |
| 7 | −0.456 | 0.458 | 2.036 | of the airfoil |
| 8 | −0.450 | 0.468 | 2.121 | and hole 12 is |
| 9 | −0.445 | 0.479 | 2.206 | closest to the |
| 10 | −0.439 | 0.489 | 2.291 | outside |
| 11 | −0.433 | 0.500 | 2.376 | diameter |
| 12 | −0.427 | 0.510 | 2.461 | (OD) of the airfoil. |
| 13 | −0.296 | 0.475 | 1.561 | Trailing Edge |
| 14 | −0.292 | 0.485 | 1.646 | (TE) Break-in |
| 15 | −0.287 | 0.495 | 1.732 | wherein hole |
| 16 | −0.282 | 0.506 | 1.818 | 13 is closest |
| 17 | −0.276 | 0.516 | 1.905 | to the inside |
| 18 | −0.271 | 0.527 | 1.992 | diameter |
| 19 | −0.265 | 0.537 | 2.080 | (ID) of the |
| 20 | −0.260 | 0.548 | 2.169 | airfoil and |
| 21 | −0.256 | 0.557 | 2.257 | hole 27 is |
| 22 | −0.249 | 0.567 | 2.345 | closest to the |
| 23 | −0.244 | 0.576 | 2.432 | outside |
| 24 | −0.238 | 0.584 | 2.519 | diameter |
| 25 | −0.232 | 0.591 | 2.605 | (OD) of the |
| 26 | −0.225 | 0.599 | 2.690 | airfoil.) |
| 27 | −0.219 | 0.606 | 2.776 | |

The X, Y and Z coordinates for the cooling holes 88 illustrated in at least FIG. 3A and the values in Tables 1 and 2 are distances given in inches from a point of origin O on the turbine blade 84, which is defined by reference numeral 100 in FIG. 3B.

In Table 1, holes 1-12 refer to the cooling holes 88 closest to the leading edge of the airfoil and the hole 1 is located closest to the inside diameter of the airfoil while hole 12 is located closest to the outside diameter of the airfoil. As used herein insider diameter of the airfoil 80 is closer to axis A than the outside diameter of the airfoil 80. In other words and as mentioned above, the airfoil 80 extends radially away from the platform 82 such that the airfoil 80 is at a further radial distance from the axis A than the platform 82. Thus, the inside diameter of the airfoil is closer to axis A than the outside diameter of the airfoil. The inside diameter of the airfoil may also be referred to the portion closest to the platform while the outside diameter of the airfoil may be referred to the tip portion of the blade.

In addition and in Table 1, holes 13-27 refer to the cooling holes 88 closest to the trailing edge and hole 13 is located closest to the inside diameter of the airfoil while hole 27 is located closest to the outside diameter of the airfoil. In other words, holes 13-27 are closer to the trailing edge than holes 1-12 and holes 1-12 are closer to the leading edge than holes 13-27.

In Table 2, holes 1-12 refer to the cooling holes closest to the leading edge of the airfoil and the hole 1 is located closest to the inside diameter of the airfoil while hole 12 is located closest to the outside diameter of the airfoil. As used herein insider diameter of the airfoil 80 is closer to axis A than the outside diameter of the airfoil 80. In other words and as mentioned above, the airfoil 80 extends radially away from the platform 82 such that the airfoil 80 is at a further radial distance from the axis A than the platform 82. Thus, the inside diameter of the airfoil is closer to axis A than the outside diameter of the airfoil. The inside diameter of the airfoil may also be referred to the portion closest to the platform while the outside diameter of the airfoil may be referred to the tip portion of the blade.

In addition and in Table 2, holes 13-27 refer to the cooling holes closest to the trailing edge and hole 13 is located closest to the inside diameter of the airfoil while hole 27 is located closest to the outside diameter of the airfoil. In other words, holes 13-27 are closer to the trailing edge than holes 1-12 and holes 1-12 are closer to the leading edge than holes 13-27.

It is, of course, understood that other units of dimensions may be used for the dimensions in Tables 1 and 2. As mentioned above, the X, Y and Z values mentioned above may in one embodiment have in average a manufacturing tolerance of about ±0.060 inches due to manufacturing and assembly tolerances. In yet another embodiment, the X, Y and Z values mentioned above may in average a manufacturing tolerance of about ±0.040 inches due to manufacturing and assembly tolerances. In still yet another embodiment, the center of the impingement holes or cooling may have a true position tolerance of up to ±0.020 inches due to manufacturing and assembly tolerances. It is, of course, understood that values or ranges greater or less than the aforementioned tolerance are considered to be within the scope of various embodiments of the present disclosure.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A turbine blade for a gas turbine engine having a plurality of cooling holes defined therein, the plurality of cooling holes being located on a suction side of an airfoil of the turbine blade and in fluid communication with an internal cavity of the turbine blade; and
wherein the plurality of cooling holes are located in the airfoil according to Cartesian coordinates of Tables 1 and/or 2, wherein the Cartesian coordinates of Tables 1 and/or 2 refer to a distance between centers of the plurality of cooling holes in X, Y and Z directions respectively and a point of Origin O, wherein the point of Origin O is radially located on a surface of a platform of the airfoil and the point of Origin O is located on a center of a blade stacking line of the turbine blade.

2. The turbine blade of claim 1, wherein the turbine blade is a second stage turbine blade of a high pressure turbine of the gas turbine engine.

3. The turbine blade of claim 2, wherein the plurality of cooling holes have a hole diameter in a range of 0.010 inches to 0.020 inches.

4. The turbine blade of claim 3, further comprising a root, the airfoil extending from the platform, wherein the platform, the root, and the airfoil are cast as a single part.

5. The turbine blade of claim 1, wherein the plurality of holes have a hole diameter in a range of 0.010 inches to 0.020 inches.

6. The turbine blade of claim 5, further comprising a root, the airfoil extending from the platform, wherein the platform, the root, and the airfoil are cast as a single part.

7. The turbine blade of claim 1, further comprising a root, the airfoil extending from the platform, wherein the platform, the root, and the airfoil are cast as a single part.

8. A turbine blade assembly for a gas turbine engine, comprising:
a rotor disk;
a plurality of turbine blades secured to the rotor disk, each turbine blade of the plurality of turbine blades having a plurality of cooling holes defined therein, the plurality of cooling holes being located on a suction side of an airfoil of each turbine blade of the plurality of turbine blades and in fluid communication with an internal cavity of each turbine blade of the plurality of turbine blades; and
wherein the plurality of cooling holes are located in the airfoil according to Cartesian coordinates of Tables 1 and/or 2, wherein the Cartesian coordinates of Tables 1 and/or 2 refer to a distance between centers of the plurality of cooling holes in X, Y and Z directions respectively and a point of Origin O, wherein the point of Origin O is radially located on a surface of a platform of the airfoil and the point of Origin O is located on a center of a blade stacking line of each turbine blade of the plurality of turbine blades.

9. The turbine blade assembly of claim 8, wherein the turbine blade assembly is a second stage turbine blade assembly of a high pressure turbine of the gas turbine engine.

10. The turbine blade assembly of claim 9, wherein the plurality of cooling holes have a hole diameter in a range of 0.010 inches to 0.020 inches.

11. The turbine blade assembly of claim 10, wherein each turbine blade of the plurality of turbine blades further comprise a root, the airfoil extending from the platform, wherein the platform, the root, and the airfoil are cast as a single part.

12. The turbine blade assembly of claim 8, wherein the plurality of cooling holes have a hole diameter in a range of 0.010 inches to 0.020 inches.

13. The turbine blade assembly of claim 12, wherein each turbine blade of the plurality of turbine blades further comprise a root, the airfoil extending from the platform, wherein the platform, the root, and the airfoil are cast as a single part.

14. The turbine blade assembly of claim 8, wherein each turbine blade of the plurality of turbine blades further comprise a root, the airfoil extending from the platform, wherein the platform, the root, and the airfoil are cast as a single part.

15. A method of cooling a suction side of an airfoil of a turbine blade of a gas turbine engine, comprising:
forming a plurality of cooling holes in the turbine blade, the plurality of cooling holes being located on the suction side of the airfoil of the turbine blade and in fluid communication with an internal cavity of the turbine blade;
wherein the plurality of cooling holes are located in the airfoil according to Cartesian coordinates of Tables 1 and/or 2, wherein the Cartesian coordinates of Tables 1 and/or 2 refer to a distance between centers of the plurality of cooling holes in X, Y and Z directions respectively and a point of Origin O, wherein the point of Origin O is radially located on a surface of a platform of the airfoil and the point of Origin O is located on a center of a blade stacking line of the turbine blade.

16. The method of claim 15, wherein the turbine blade is a second stage turbine blade of a high pressure turbine of the gas turbine engine.

17. The method of claim 16, wherein the plurality of cooling holes have a hole diameter in a range of 0.010 inches to 0.020 inches.

18. The method of claim 17, wherein the turbine blade further comprises a root, the airfoil extending from the platform, wherein the platform, the root, and the airfoil are cast as a single part.

19. The method of claim 15, wherein the plurality of cooling holes have a hole diameter in a range of 0.010 inches to 0.020 inches.

20. The method of claim 15, wherein the turbine blade further comprises a root, the airfoil extending from the platform, wherein the platform, the root, and the airfoil are cast as a single part.

* * * * *